United States Patent
Shih et al.

(10) Patent No.: US 8,860,659 B2
(45) Date of Patent: Oct. 14, 2014

(54) DISPLAY APPARATUS

(75) Inventors: Wei-tong Shih, Wugu (TW); Chih-hung Tsai, Wugu (TW); Wen-chi Lin, Wugu (TW)

(73) Assignee: Hannstar Display Corporation, Wugu, Taipei County (TW)

( * ) Notice: Subject to any disclaimer, the term of this patent is extended or adjusted under 35 U.S.C. 154(b) by 308 days.

(21) Appl. No.: 13/312,850

(22) Filed: Dec. 6, 2011

(65) Prior Publication Data

US 2012/0169721 A1 Jul. 5, 2012

(30) Foreign Application Priority Data

Dec. 31, 2010 (TW) .............................. 99147310 A

(51) Int. Cl.
*G09G 3/34* (2006.01)
*G02B 27/22* (2006.01)
*G02B 26/00* (2006.01)

(52) U.S. Cl.
CPC .......... *G02B 27/2214* (2013.01); *G02B 26/004* (2013.01)
USPC ............................................ 345/107; 349/15

(58) Field of Classification Search
USPC ................... 348/51, 54, 55; 345/419
See application file for complete search history.

(56) References Cited

U.S. PATENT DOCUMENTS

| | | | |
|---|---|---|---|
| 7,116,467 B2 * | 10/2006 | Kornbrekke et al. | 359/296 |
| 7,956,820 B2 | 6/2011 | Huitema et al. | |
| 2002/0145792 A1 * | 10/2002 | Jacobson et al. | 359/296 |
| 2006/0056791 A1 * | 3/2006 | Tzschoppe | 385/146 |
| 2008/0211734 A1 * | 9/2008 | Huitema et al. | 345/3.1 |
| 2009/0027329 A1 * | 1/2009 | Choi et al. | 345/107 |
| 2009/0147178 A1 * | 6/2009 | Ahn et al. | 349/62 |
| 2010/0110316 A1 * | 5/2010 | Huang et al. | 349/15 |
| 2012/0188152 A1 * | 7/2012 | Henzen | 345/107 |

FOREIGN PATENT DOCUMENTS

| | | |
|---|---|---|
| TW | 200706911 A | 2/2007 |
| TW | 200937368 A | 9/2009 |

* cited by examiner

*Primary Examiner* — Sath V Perungavoor
*Assistant Examiner* — Janese Duley
(74) *Attorney, Agent, or Firm* — Cheng-Ju Chiang

(57) ABSTRACT

A display apparatus is disclosed. The display apparatus comprises a display panel and a parallax barrier plate. The parallax barrier plate includes a plurality of parallax barrier cells, wherein each of the parallax barrier cells comprises a receiver, a plurality of charged pigment particles and a switch electrode. The charged pigment particles are disposed in the receiver. The switch electrode is disposed at one side of the receiver for driving the charged pigment particles.

8 Claims, 3 Drawing Sheets

DISPLAY APPARATUS

FIELD OF THE INVENTION

The present invention relates to a display apparatus, and more particularly, to a display apparatus capable of switching between two-dimensional (2D) images/three-dimensional (3D) images.

BACKGROUND OF THE INVENTION

Currently, a display apparatus capable of displaying 2D/3D images has been developed. The display apparatus which is capable of switching 2D/3D images comprises two liquid crystal (LC) panels as a 2D display panel and a parallax barrier panel. When displaying 2D images, the parallax barrier panel is in a transparent status, thereby allowing the 2D images of the 2D display panel to be shown. When displaying 3D images, the parallax barrier panel can form a plurality of parallax barriers, and a 3D image effect can be formed by using the parallax barriers.

However, when displaying 3D images, the parallax barrier panel is required to apply a voltage continuously so as to control LC molecules to form the parallax barriers, thus more power is consumed. Moreover, the 2D/3D switchable display having two LC panels can easily increase its weight and thickness.

SUMMARY OF THE INVENTION

Therefore, an aspect of the present invention is to provide a display apparatus for selectively displaying 2D/3D images and capable of saving energy consumption and reducing the thickness and weight thereof.

According to an embodiment of the present invention, the display apparatus for displaying 2D/3D images comprises: a display panel; a parallax barrier plate includes a plurality of parallax barrier cells, wherein each of the parallax barrier cells comprises: a receiver; a plurality of charged pigment particles filled in the receiver; and a switch electrode disposed at one side of the receiver for driving the charged pigment particles to move, wherein the charged pigment particles are dispersed in the receiver when the display apparatus is in a 3D image displaying mode, and the switch electrode is electrically connected to a voltage for driving the charged pigment particles to move toward the inner sidewall of the receiver.

In one embodiment of the present invention, the display panel is a liquid crystal display (LCD) panel, and the display apparatus further comprises a backlight module.

In one embodiment of the present invention, the parallax barrier plate is disposed at one side of the display panel, and the backlight module is disposed at another side of the display panel.

In one embodiment of the present invention, the parallax barrier plate includes a first parallax barrier layer and a second parallax barrier layer, and the second parallax barrier layer is disposed between the display panel and the first parallax barrier layer for reflecting the light from the display panel.

In one embodiment of the present invention, the parallax barrier plate is disposed between the display panel and a backlight module.

In one embodiment of the present invention, the first parallax barrier layer comprises a plurality of charged pigment particles, and the second parallax barrier layer comprises a plurality of charged reflection particles.

In one embodiment of the present invention, the display panel may be a liquid crystal display panel, an organic light emission diode (OLED) panel, a plasma display panel (PDP) or a field emission display panel.

In one embodiment of the present invention, the switch electrode of each of the parallax barrier cells includes a center electrode and side electrodes, and the side electrodes are formed at both sides or the periphery of the receiver, and the center electrode is formed between the side electrodes.

In one embodiment of the present invention, the charged pigment particles are disposed in the receiver and dispersed in a transparent fluid.

In one embodiment of the present invention, the charged pigment particles are black.

Therefore, the display apparatus of the present invention can selectively display 2D/3D images. When the display of the present invention is in the 3D image displaying mode, the parallax barrier plate is not required to be connected to a power source, thereby energy consumption is significantly saved. Moreover, the parallax barrier plate of the present invention is relatively thin and light, thereby the thickness and weight of the display apparatus is reduced.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
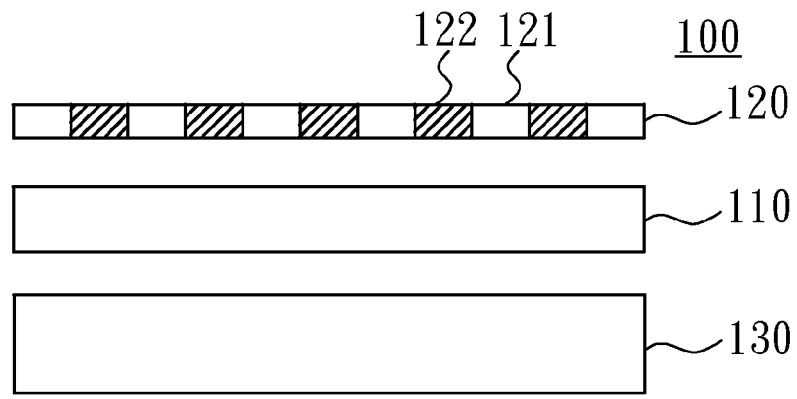
FIG. 1 is a schematic diagram showing a display apparatus according to a first embodiment of the present invention.

In order to make the illustration of the present invention more explicit and complete, the following description is stated with reference to FIG. 1 through FIG. 4A and FIG. 4B.

In the drawings, like reference numerals indicate like components or items.

Referring to FIG. 1, a schematic diagram showing a display apparatus according to a first embodiment of the present invention is illustrated. The 2D/3D switchable display apparatus 100 of the present embodiment can be switched between a 2D image displaying mode and a 3D image displaying mode in accordance with a user's needs for displaying 2D/3D images. The display apparatus 100 comprises a display panel 110 and a parallax barrier plate 120. The display panel 110 is configured to display 2D images. The parallax barrier plate 120 is disposed at one side of the display panel 110 for forming a parallax barrier effect in the 3D image displaying mode, and thus 3D images can be formed by using the parallax barrier plate 120.

Referring to FIG. 1 again, the display panel 110 may be a liquid crystal display (LCD) panel, an organic light emission diode (OLED) panel, a plasma display panel (PDP) or a field emission display panel. In the present embodiment, the display panel 110 may be the LCD panel. At this time, the display apparatus 100 may further comprise a backlight module 130 for providing a backlight to the display panel 110 (LCD panel).

Referring to FIG. 1 again, the body of the parallax barrier plate 120 is made of a transparent insulating material, and comprises a plurality of transparent cells 121 and a plurality of parallax barrier cells 122. The transparent cells 121 and the parallax barrier cells 122 may be formed from closed microcups and arranged in an alternating manner. Thus, there is a space (the transparent cell 121) between each two adjacent parallax barrier cells 122.

Referring to FIG. 1 again, a transparent fluid (not shown), such as air, water, a dielectric solvent or a solvent mixture, is filled in the transparent cells 121 for allowing light to pass through. The transparent cells 121 may also be solid units made of a transparent material (such as glass) without the receivers and the fillings.

Figure 2A:
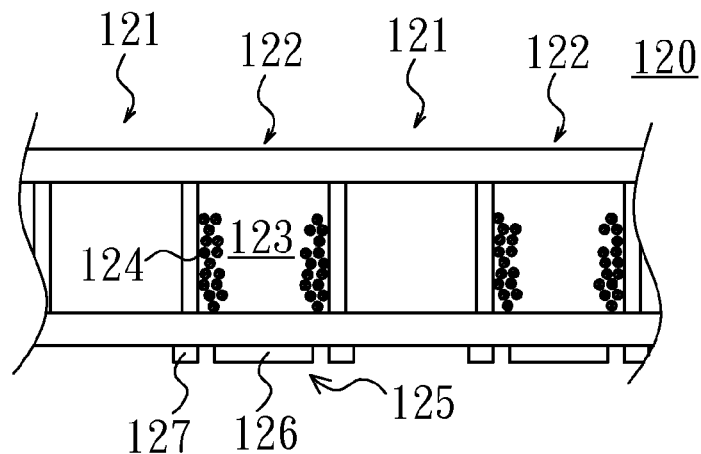
FIG. 2A and FIG. 2B are cross-sectional views showing the parallax barrier plate of the display apparatus according to the first embodiment of the present invention.
Figure 2B:
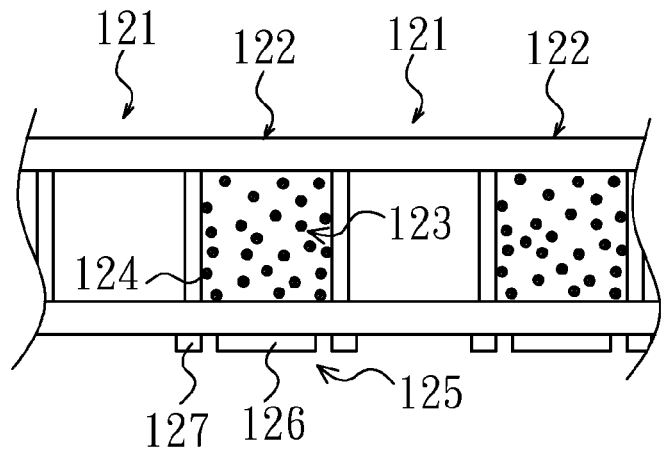

Referring to FIG. 2A and FIG. 2B, cross-sectional views showing the parallax barrier plate of the display apparatus according to the first embodiment of the present invention are illustrated. Each of the parallax barrier cells 122 comprises a receiver 123, a plurality of charged pigment particles 124 and a switch electrode 125. The receiver 123 is formed in a closed microcapsule (the parallax barrier cell 122) for receiving the charged pigment particles 124, wherein the receiver 123 may be formed by using an embossing process or a photolithographic process. The width or depth of the receiver 123 may be between 5 μm and 200 μm.

Referring to FIG. 2A and FIG. 2B again, the charged pigment particles 124 are filled in the receiver 123 and dispersed in a transparent fluid, such as air, water, a dielectric solvent or a solvent mixture, thereby forming an electrophoretic fluid. The medium of the electrophoretic fluid may be the dielectric solvent (such as hydrocarbons) which preferably has a low viscosity for high particle mobility. The charged pigment dispersions may be manufactured by any of the well-known methods including grinding, milling, attriting, microfluidizing and ultrasonic techniques. For example, pigment particles in the form of a fine powder are added to the suspending solvent and the resulting mixture is ball milled or attrited for several hours to break up the highly agglomerated dry pigment powder into primary particles.

The charged pigment particles 124 may be of dark color, preferably black, for sheltering or absorbing light. Referring to FIG. 2A again, when the charged pigment particles 124 of the parallax barrier cells 122 are affected by a electric field, the charged pigment particles 124 are attracted by the electric field and thus move in the receiver 123. On the contrary, referring to FIG. 2B again, when the charged pigment particles 124 are not affected by the electric field, the dark charged pigment particles 124 are dispersed in the receiver 123 for sheltering or absorbing light, thereby forming the parallax barrier effect.

Referring to FIG. 2A and FIG. 2B again, the switch electrode 125 is formed at one side of the receiver 123 for driving the charged pigment particles 124 to move in the receiver 123. The switch electrode 125 is preferably made of a transparent conductive material, such as ITO, IZO, AZO, ATO, GZO, TCO, ZnO or PEDOT. Each of the switch electrodes 125 includes a center electrode 126 and side electrodes 127. The side electrodes 127 are formed at both sides or the periphery of the receiver 123, and the center electrode 126 is formed between the side electrodes 127. There is a predetermined space between the center electrode 126 and the side electrodes 127. Referring to FIG. 2A again, when the switch electrode 125 is electrically connected to a driving voltage (i.e. when the driving voltage is applied to the switch electrode 125), there is a potential difference between the center electrode 126 and the side electrodes 127, thereby forming the electric field for driving the charged pigment particles 124 to move toward the side electrodes 127. At this time, the charged pigment particles 124 are attracted on the inner sidewall of the receiver 123, and thus light can easily pass through the receiver 123 of the parallax barrier cells 122. On the contrary, referring to FIG. 2B again, when the switch electrode 125 is not electrically connected to a driving voltage (i.e. when the driving voltage is not applied to the switch electrode 125), there is no potential difference between the center electrode 126 and the side electrodes 127, and the charged pigment particles 124 are dispersed in the receiver 123 for sheltering or absorbing light, thereby forming the parallax barrier effect.

Referring to FIG. 1 again, in this embodiment, the display panel 110 may be the LCD panel. At this time, the parallax barrier plate 120 is disposed at one side of the display panel 110, and the backlight module 130 is disposed at another side of the display panel 110. Referring to FIG. 2A again, when the display apparatus 100 is switched to the 2D image displaying mode, the parallax barrier cells 122 of the parallax barrier plate 120 can form the electric field for driving the charged pigment particles 124 to move toward the inner sidewall of the receiver 123, and thus light can easily pass through the transparent cells 121 and the parallax barrier cells 122 of the parallax barrier cells 122, i.e. the user can directly watch the images displayed by the display panel 110, thereby achieving a 2D image displaying effect. Referring to FIG. 2B again, when the display apparatus 100 is switched to the 3D image displaying mode, the parallax barrier cells 122 of the parallax barrier plate 120 is not required to be connected to a power, and the charged pigment particles 124 can be dispersed in the receiver 123, and thud each of the parallax barrier cells 122 is in an opaque status. At this time, the parallax barrier effect can be formed by using the parallax barrier cells 122 arranged in the alternating manner, and thus the images displayed by the display panel 110 can have the 3D image displaying effect.

Therefore, the display apparatus 100 can utilize the parallax barrier plate 120 to switch to the 2D image displaying mode or 3D image displaying mode for displaying 2D/3D images. When the display apparatus 100 is in the 3D image displaying mode, the parallax barrier plate 120 is not required to be connected to a power, thereby reducing the power consumption thereof. Furthermore, in comparison with the conventional 2D/3D switchable display, the display apparatus 100 can be thinner and lighter by using the parallax barrier plate 120 with the electrophoretic fluid.

Figure 3:
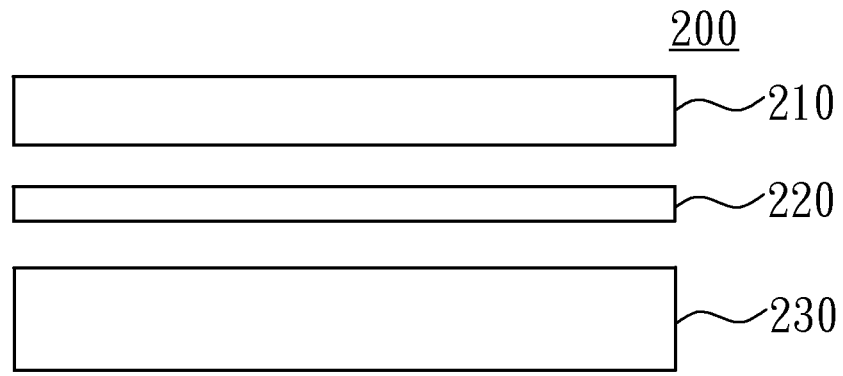
FIG. 3 is a schematic diagram showing the display apparatus according to a second embodiment of the present invention.

Referring to FIG. 3, a schematic diagram showing the display apparatus according to a second embodiment of the present invention is illustrated. In the second embodiment, the display apparatus 200 comprises a display panel 210, a parallax barrier plate 220 and a backlight module 230. The display panel 210 may be the LCD panel for displaying 2D images. The parallax barrier plate 220 can be disposed at one side of the display panel 210 and positioned between the display panel 210 and the backlight module 230. When the display apparatus 200 is switched to the 2D image displaying mode, the parallax barrier plate 220 can be transparent for allowing the light of the backlight module 230 to pass and be emitted to the display panel 210, and thus the display apparatus 200 can display 2D images. When the display apparatus 200 is switched to the 3D image displaying mode, the parallax barrier plate 220 can form the parallax barrier effect, and the user's eyes can respectively watch different images, thereby forming a 3D image effect with depth perception. Therefore, the display apparatus 200 of the second embodiment can utilize the parallax barrier plate 220 to switch to the 2D image displaying mode or the 3D image displaying mode.

Figure 4A:
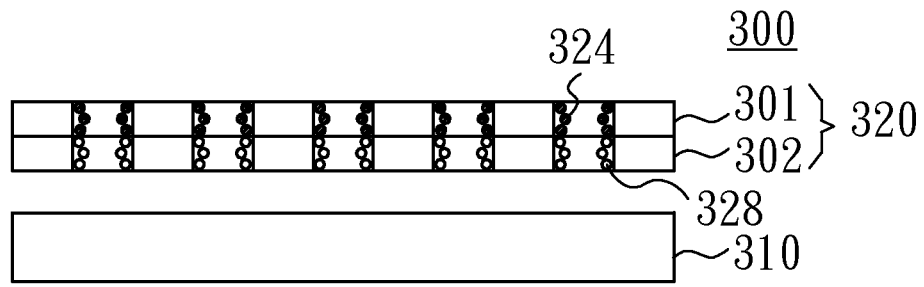
FIG. 4A and FIG. 4B are schematic diagrams showing the display apparatus according to a third embodiment of the present invention.
Figure 4B:
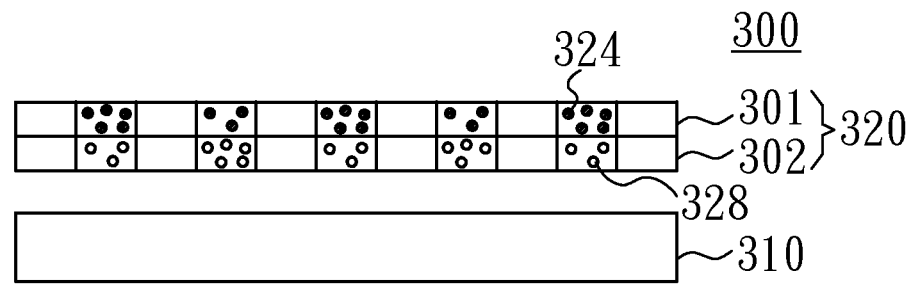

Referring to FIG. 4A and FIG. 4B, schematic diagrams showing the display apparatus according to a third embodiment of the present invention are illustrated. In the third embodiment, the display apparatus 300 comprises a display panel 310 and a parallax barrier plate 320. The display panel 310 may be the LCD panel or other panels. The parallax barrier plate 320 can be disposed at one side of the display panel 310. The parallax barrier plate 320 includes a first parallax barrier layer 301 and a second parallax barrier layer 302. The second parallax barrier layer 302 is disposed between the display panel 310 and the first parallax barrier layer 301 for reflecting the light from the display panel 310, thereby raising light reuse rate. The first parallax barrier layer 301 comprises a plurality of dark charged pigment particles 324 for forming the parallax barrier effect. The second parallax barrier layer 302 comprises a plurality of charged reflection particles 328 which are made of a light reflective material, such as Ag, Al, Au, Cr, Cu, In, Ir, Ni, Pt, Re, Rh, Sn, Ta, W, Mn, white paint with etiolation-resistant and heat-resistant properties ($TiO_2$) or any combination thereof for reflecting light. Referring to FIG. 4A again, when the display apparatus 300 is switched to the 2D image displaying mode, the first parallax barrier layer 301 and the second parallax barrier layer 302 of the parallax barrier plate 320 can be transparent, and thus the user can directly watch the displayed images of the display panel 310 for achieving a 2D image displaying effect. Referring to FIG. 4B again, when the display apparatus 300 is switched to the 3D image displaying mode, the parallax barrier plate 320 can form a parallax barrier effect, the first parallax barrier layer 301 of the parallax barrier plate 320 can form the parallax barrier effect, and thus the displayed images of the display panel 310 can have the 3D image effect by using the first parallax barrier layer 301. Furthermore, the light of the display panel 310 can be reflected by the charged reflection particles 328 of the second parallax barrier layer 302, thereby raising the light reuse rate and saving energy consumption.

Figure 5A:
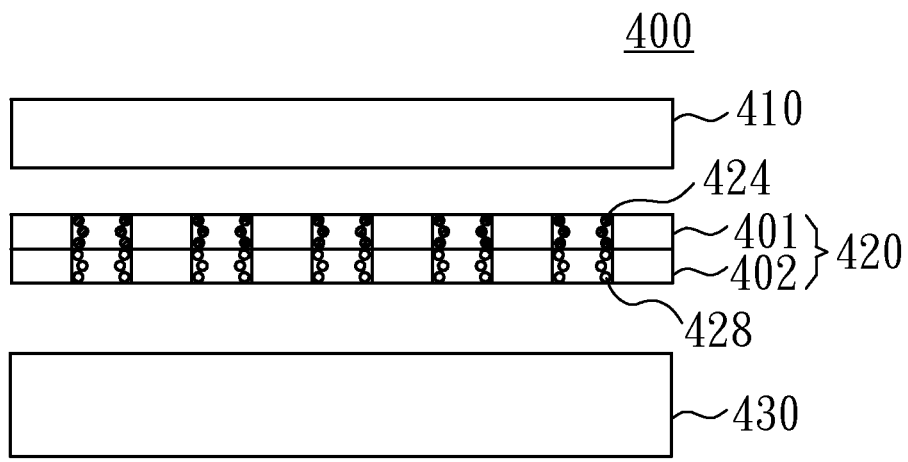
FIG. 5A and FIG. 5B are schematic diagrams showing the display apparatus according to a fourth embodiment of the present invention.
Figure 5B:
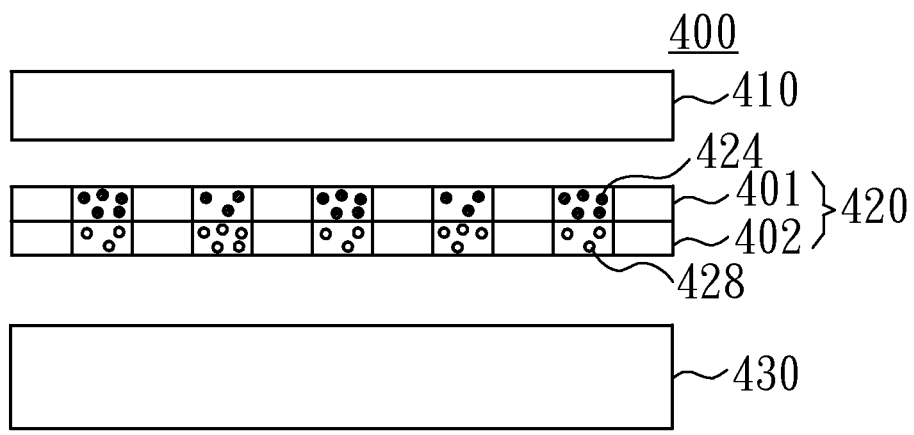

Referring to FIGS. 5A and 5B, schematic diagrams showing the display apparatus according to a fourth embodiment of the present invention are illustrated. In the fourth embodiment, the display apparatus 400 comprises a display panel 410, a parallax barrier plate 420 and a backlight module 430. The display panel 410 may be the LCD panel. The parallax barrier plate 420 can be disposed at one side of the display panel 410 and positioned between the display panel 410 and the backlight module 430. The parallax barrier plate 420 comprises a first parallax barrier layer 401 and a second parallax barrier layer 402. The first parallax barrier layer 401 is disposed between the display panel 410 and the parallax barrier plate 420, and the second parallax barrier layer 402 is disposed between the first parallax barrier layer 401 and the backlight module 430 for reflecting the light from backlight module 430, thereby raising light reuse rate. The first parallax barrier layer 401 comprises a plurality of dark charged pigment particles 424 for forming the parallax barrier effect. The second parallax barrier layer 402 comprises a plurality of charged reflection particles 428 which are made of a light reflective material for reflecting light. Referring to FIG. 5A again, when the display apparatus 400 is switched to the 2D image displaying mode, the first parallax barrier layer 401 and the second parallax barrier layer 402 of the parallax barrier plate 420 can be transparent for allowing the backlight from the backlight module 430 to pass and be emitted to the display panel 410, and thus the display apparatus 400 can display 2D images. Referring to FIG. 5B again, when the display apparatus 400 is switched to the 3D image displaying mode, the parallax barrier plate 420 can form a parallax barrier effect for displaying 3D images. Furthermore, the light of the backlight module 430 can be reflected by the charged reflection particle 428 of the second parallax barrier layer 402, thereby raising the light reuse rate and saving energy.

As described above, the display apparatus of the present invention can utilize the parallax barrier plate with the electrophoretic fluid to switch to the 2D image displaying mode or 3D image displaying mode for selectively displaying 2D/3D images. In comparison with the conventional 2D/3D switchable display, when the display of the present invention is in the 3D image displaying mode, the parallax barrier plate is not required to be connected to a power, thereby significantly saving energy. Moreover, the parallax barrier plate with the electrophoretic fluid is relatively thin and light, thereby significantly reducing the thickness and weight of the display apparatus of the present invention.

As is understood by a person skilled in the art, the foregoing embodiments of the present invention are strengths of the present invention rather than limiting of the present invention. It is intended to cover various modifications and similar arrangements included within the spirit and scope of the appended claims, the scope of which should be accorded the broadest interpretation so as to encompass all such modifications and similar structures.

What is claimed is:

1. A display apparatus for displaying two-dimensional /three-dimensional (2D/3D) images comprising:
    a display panel; and
    a parallax barrier plate including a plurality of parallax barrier cells, wherein each of the parallax barrier cells comprises:
        a receiver;
        a plurality of charged pigment particles filled in the receiver; and
        a switch electrode disposed at one side of the receiver for driving the charged pigment particles to move, wherein the charged pigment particles are dispersed in the receiver when the display apparatus is in a 3D image displaying mode, and the switch electrode is electrically connected to a voltage for driving the charged pigment particles to move toward the inner sidewall of the receiver;
        wherein the parallax barrier plate includes a first parallax barrier layer and a second parallax barrier layer, and the second parallax barrier layer is disposed between the display panel and the first parallax barrier layer for reflecting the light from the display panel;
        wherein the first parallax barrier layer comprises the plurality of charged pigment particles, and the second parallax barrier layer comprises a plurality of charged reflection particles, and the first parallax barrier layer and the second parallax barrier layer are transparent when the display apparatus is switched to a 2D image displaying mode.

2. The display apparatus as claimed in claim 1, wherein the display panel is a liquid crystal display (LCD) panel, and the display apparatus further comprises a backlight module.

3. The display apparatus as claimed in claim 2, wherein the parallax barrier plate is disposed at one side of the display panel, and the backlight module is disposed at another side of the display panel.

4. The display apparatus as claimed in claim 1, wherein the parallax barrier plate is disposed between the display panel and a backlight module.

5. The display apparatus as claimed in claim 1, wherein the display panel is a liquid crystal display panel, an organic light emission diode (OLED) panel, a plasma display panel (PDP) or a field emission display panel.

6. The display apparatus as claimed in claim 1, wherein the switch electrode of each of the parallax barrier cells includes a center electrode and side electrodes, and the side electrodes are formed at both sides or the periphery of the receiver, and the center electrode is formed between the side electrodes.

7. The display apparatus as claimed in claim 1, wherein the charged pigment particles are disposed in the receiver and dispersed in a transparent fluid.

8. The display apparatus as claimed in claim 1, wherein the charged pigment particles are black.

* * * * *